UNITED STATES PATENT OFFICE.

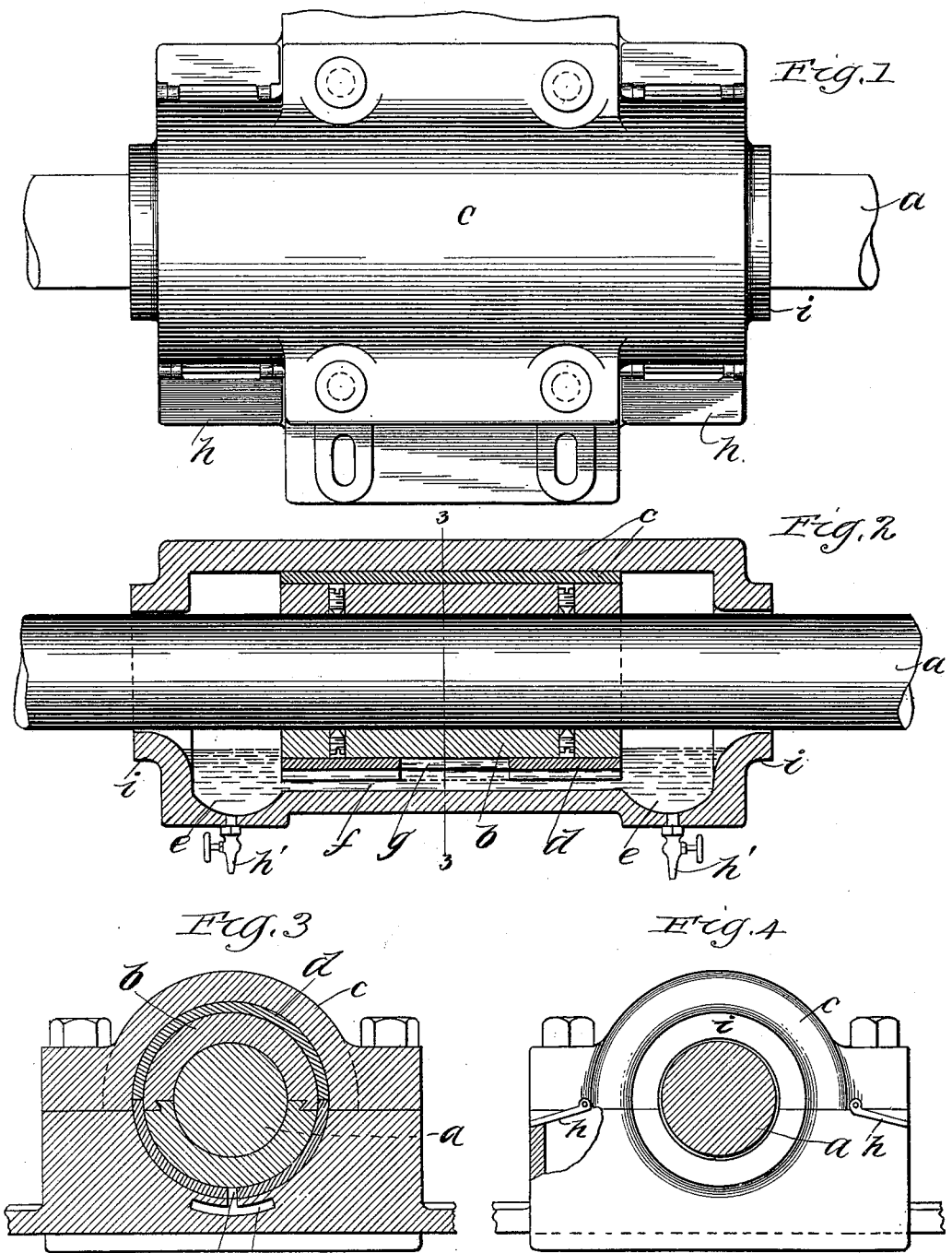

MATHIAS BRUSCHER, OF CHICAGO, ILLINOIS.

MEANS FOR LUBRICATING ROTATING SHAFTS.

SPECIFICATION forming part of Letters Patent No. 643,710, dated February 20, 1900.

Application filed March 6, 1899. Serial No. 707,983. (No model.)

*To all whom it may concern:*

Be it known that I, MATHIAS BRUSCHER, a citizen of the United States, residing at Chicago, in the county of Cook and State of Illinois, have invented a certain new and useful Improvement in Means for Lubricating Rotating Shafts, (Case No. 1,) of which the following is a full, clear, concise, and exact description, reference being had to the accompanying drawings, forming a part of this specification.

My invention relates to means for lubricating rotating shafts, and has for its object the improvement in the construction of devices employed for this purpose and to dispense with any movable parts specially employed for the purpose of transmitting oil from a chamber or reservoir to the shaft. A well-known device of the prior art is one in which a ring surrounds the shaft, the bearing upon either side of the ring being cut away to permit the ring, which dips into the body of oil, to transfer the oil directly to the shaft, the oil then working both ways between the shaft and the bearing.

My invention in its preferred form may be generally described as consisting in a bearing for the shaft and a reservoir or fountain for the oil, a passage through the bearing being provided for permitting the oil to pass from the reservoir or fountain to the shaft, the reservoir, the shaft, and the passage in the bearing for the shaft being so relatively located that the oil finds its way to the shaft by force of gravity. In order to prevent the oil from working outside of the bearing or journal-box surrounding the shaft, I provide an annular enlargement of the shaft, which works within the shaft-bearing, and it is to this enlargement that I convey the oil in accordance with my invention, a portion of the enlargement, by means of the invention, being constantly immersed in the oil, whereby this enlargement in itself performs the double function of supporting the shaft in its bearing and of conveying the oil to the bearing.

I believe that I am the first to provide in a lubricating device for shafts an enlargement for the shaft which is capable of performing the double function of supporting the shaft in its bearing and of conveying the oil to the parts of the shaft-mounting having frictional contact.

I will explain my invention more particularly by reference to the accompanying drawings, which illustrate the preferred embodiment thereof.

Figure 1 is a plan view of my improved self-oiling journal. Fig. 2 is a sectional elevation of the journal-box with the shaft shown in complete elevation. Fig. 3 is a cross-sectional view on line 3 3 of Fig. 2. Fig. 4 is an end elevation of the journal-box with the shaft in place, a part of the box being broken away.

Like letters indicate like parts throughout the different views.

The shaft $a$ is of any size suited to the work it is to do. The enlargement $b$ of the shaft is formed of two half-rings which are dovetailed together, this construction being preferred, so that the sleeve or enlargement of the shaft may be readily secured thereon even though the shaft be in place, and it is this feature of construction that enables me to apply the device of my invention to shafts of machinery that has been installed.

The journal-box $c$ may be of any suitable construction, the base and cap thereof being formed, as is usual, in two separate parts, which may be assembled about the enlargement of the shaft. A lining $d$, of Babbitt metal, is secured to the journal-box and is interposed between the shaft or its enlargement and the cap and base of the journal-box. In the embodiment of the invention shown two reservoirs or fountains $e$ $e$ are provided, one at either end of the enlargement of the shaft, in which oil is disposed and from which oil may be conveyed to the enlargement $b$ by way of a duct $f$, provided in the base of the journal-box, and preferably of the cross-section shown in Fig. 3. The lining of Babbitt metal is for a short distance cut away at $g$, thus completing a duct or passage to permit the oil in the recess $f$ to have access to the enlargement $b$. The enlargement $b$ is thus constantly immersed at its central peripheral portion in the oil, so that the oil is readily transferred upon the enlargement, not only in sidewise directions, but also in an annular or circumferential direction about the enlargement, and this feature I also consider to be new with me. By the provision of the enlargement I am enabled to prevent the oil from working to the outside of the journal-box. Lids $h\ h$ are provided for the purpose of admitting oil to the fountains $e\ e$, and cocks $h'\ h'$ are provided for draining the spent oil from the fountains.

While I have shown two oil-fountains, one upon each side of the journal proper, I do not wish to be limited to this feature of construction. The journal-box is preferably provided with annular flanges $i\ i$, which fit the shaft closely enough to permit slight change in the alinement thereof with respect to the journal-box, while at the same time preventing the oil from passing from the journal-box by way of the space between the flanges $i\ i$ and the shaft.

Changes from the precise construction herein shown and particularly described may be made without departing from the spirit of the invention, and I do not therefore wish to be limited to the precise construction shown, but, Having described my invention, I claim as new and desire to secure by Letters Patent—

1. In apparatus of the class described, the combination with a journal-box, of an oil reservoir or fountain provided therein, the journal-box being provided in its lower portion with a duct or passage having communication with the oil-reservoir and with the interior of the journal-box, a shaft and an enlargement provided thereon, rotatably mounted in said journal-box, the said enlargement being supported upon the lower bearing-surface of the journal-box below the oil-level of the reservoir or fountain, whereby a section of said enlargement is constantly immersed in and supplied with oil and said oil is distributed circumferentially and laterally within the bearing, substantially as described.

2. In apparatus of the class described, the combination with the journal-box $c$, of an oil reservoir or fountain $e$ provided therein, the journal-box being provided in its lower portion with a duct or passage having communication with the oil-reservoir and with the interior of the journal-box, a shaft $a$, and an enlargement $b$ provided thereon and rotatably mounted in said journal-box, the said enlargement being supported upon the lower bearing-surface of the journal-box below the oil-level of the reservoir or fountain, whereby a section of said enlargement is constantly immersed in and supplied with oil and said oil is distributed circumferentially and laterally within the bearing, substantially as described.

3. In apparatus of the class described, the combination with the journal-box $c$, of an oil reservoir or fountain $e$ provided therein, the journal-box being provided in its lower portion with a duct or passage having communication with the oil-reservoir and with the interior of the journal-box, a shaft $a$, and an enlargement $b$ formed of dovetailed sections adapted to be slipped into position upon the shaft provided thereon and rotatably mounted in said journal-box, the said enlargement being supported upon the lower bearing-surface of the journal-box below the oil-level of the reservoir or fountain, whereby a section of said enlargement is constantly immersed in and supplied with oil and said oil is distributed circumferentially and laterally within the bearing, substantially as described.

In witness whereof I hereunto subscribe my name this 4th day of March, A. D. 1899.

MATHIAS BRUSCHER.

Witnesses:
GEORGE L. CRAGG,
A. L. LAWRENCE.